United States Patent [19]

Drlik

[11] Patent Number: 4,617,698
[45] Date of Patent: Oct. 21, 1986

[54] SPRING-BIASED HINGE ASSEMBLY FOR SPECTACLES

[75] Inventor: Günther Drlik, Pforzheim, Fed. Rep. of Germany

[73] Assignee: Obe-Werk Ohnmacht & Baumgartner GmbH & Co. K.G., Ispringen, Fed. Rep. of Germany

[21] Appl. No.: 738,495

[22] Filed: May 28, 1985

Related U.S. Application Data

[63] Continuation-in-part of Ser. No. 478,709, Mar. 25, 1983, abandoned.

[30] Foreign Application Priority Data

Apr. 8, 1982 [DE] Fed. Rep. of Germany ....... 3213174
Dec. 10, 1982 [DE] Fed. Rep. of Germany ....... 3245797

[51] Int. Cl.⁴ .......................... G02C 5/16; G02C 5/22
[52] U.S. Cl. ...................................... 16/228; 351/113; 351/153
[58] Field of Search ................. 16/228, 286, 296, 304; 351/113, 153

[56] References Cited

U.S. PATENT DOCUMENTS

| | | | |
|---|---|---|---|
| 3,567,314 | 3/1971 | Speer | 16/228 X |
| 3,567,315 | 3/1971 | Speer | 351/113 |
| 4,005,930 | 2/1977 | Guenin | 16/228 X |
| 4,428,094 | 1/1984 | Emain | 16/228 |

FOREIGN PATENT DOCUMENTS

| | | | |
|---|---|---|---|
| 3928 | 9/1979 | European Pat. Off. | 351/153 |
| 2126898 | 11/1972 | Fed. Rep. of Germany | 351/113 |
| 1511263 | 12/1967 | France | 351/113 |

*Primary Examiner*—Douglas D. Watts
*Attorney, Agent, or Firm*—Balogh, Osann, Kramer, Dvorak, Genova & Traub

[57] ABSTRACT

This invention relates to a spring-biased hinge assembly for spectacles. The hinge assembly comprises a bow-side section defining a cavity, and a slider, which carries a bow-side hinge element and extends into the cavity and is adapted to be extended from said cavity against spring action. The bow-side hinge element cooperates with the midportion-side hinge element. The hinge assembly should be slender and should be accommodated to a large extent in the end portion of the bow. For this purpose, the cavity is defined by a flat tubular element, in which a tongue of the slider is slidably mounted. The tongue has a longitudinal slot, in which the return spring extends, which engages an abutment that extends into the wall of the tubular member and through said slot.

7 Claims, 12 Drawing Figures

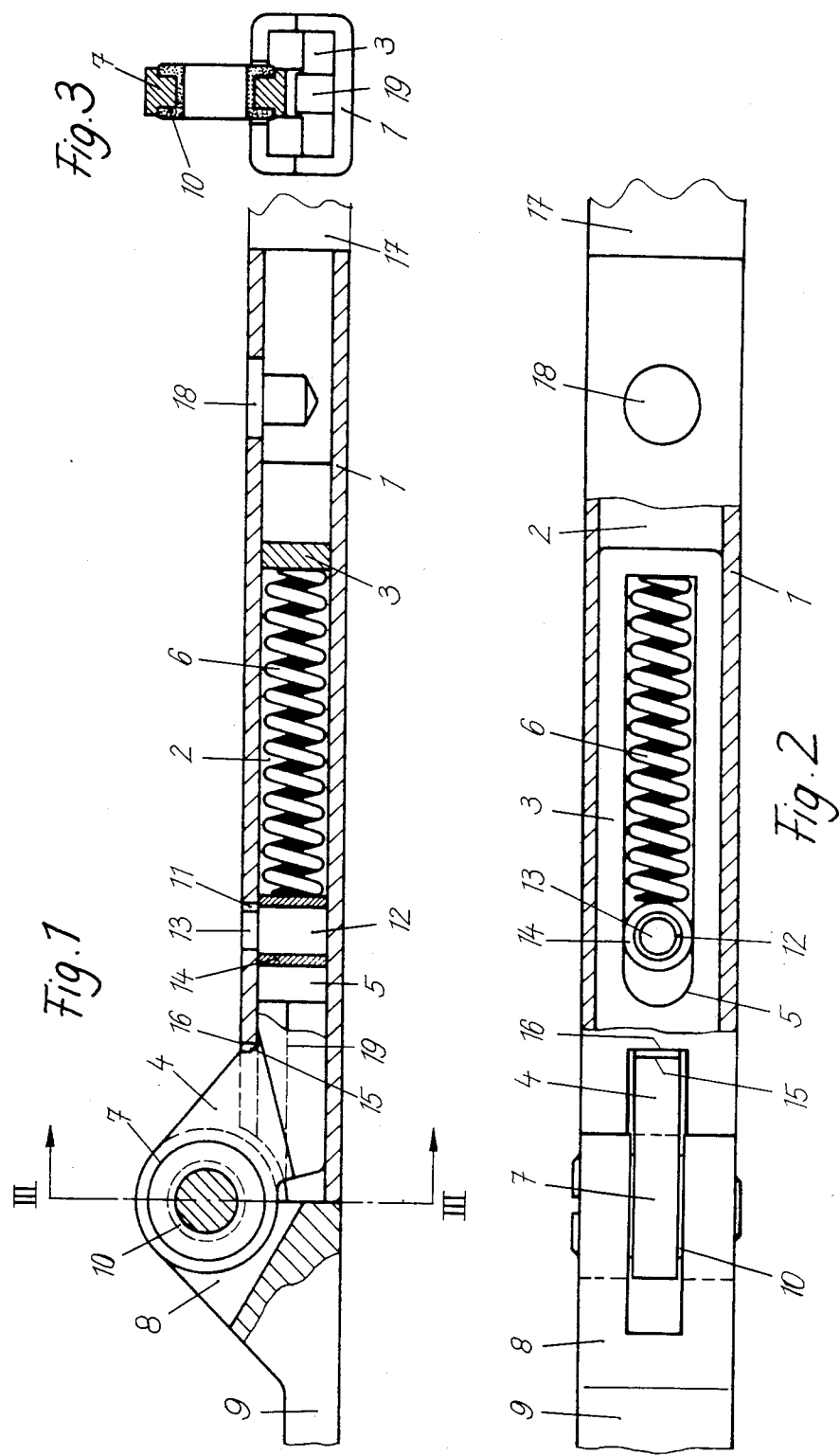

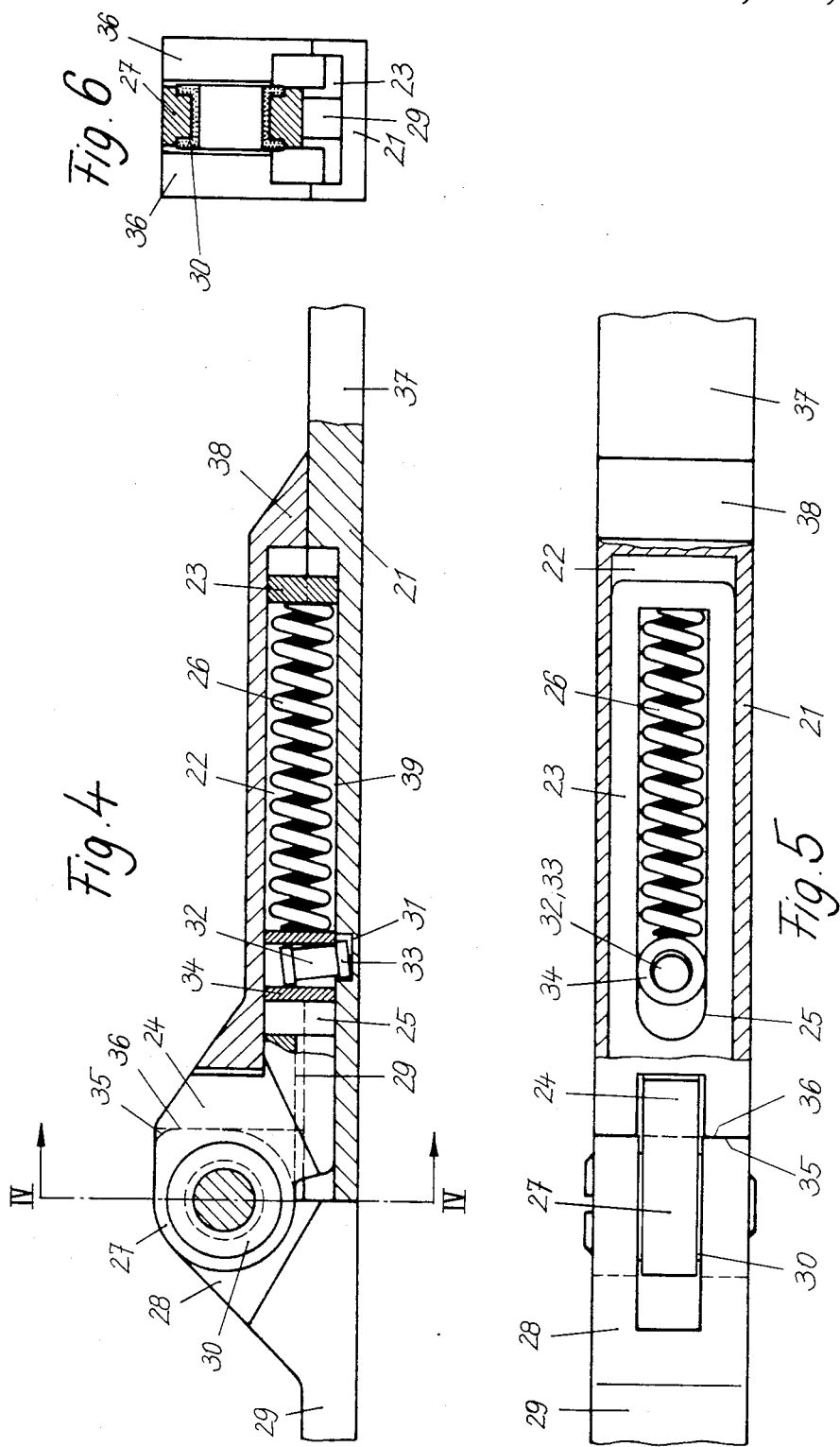

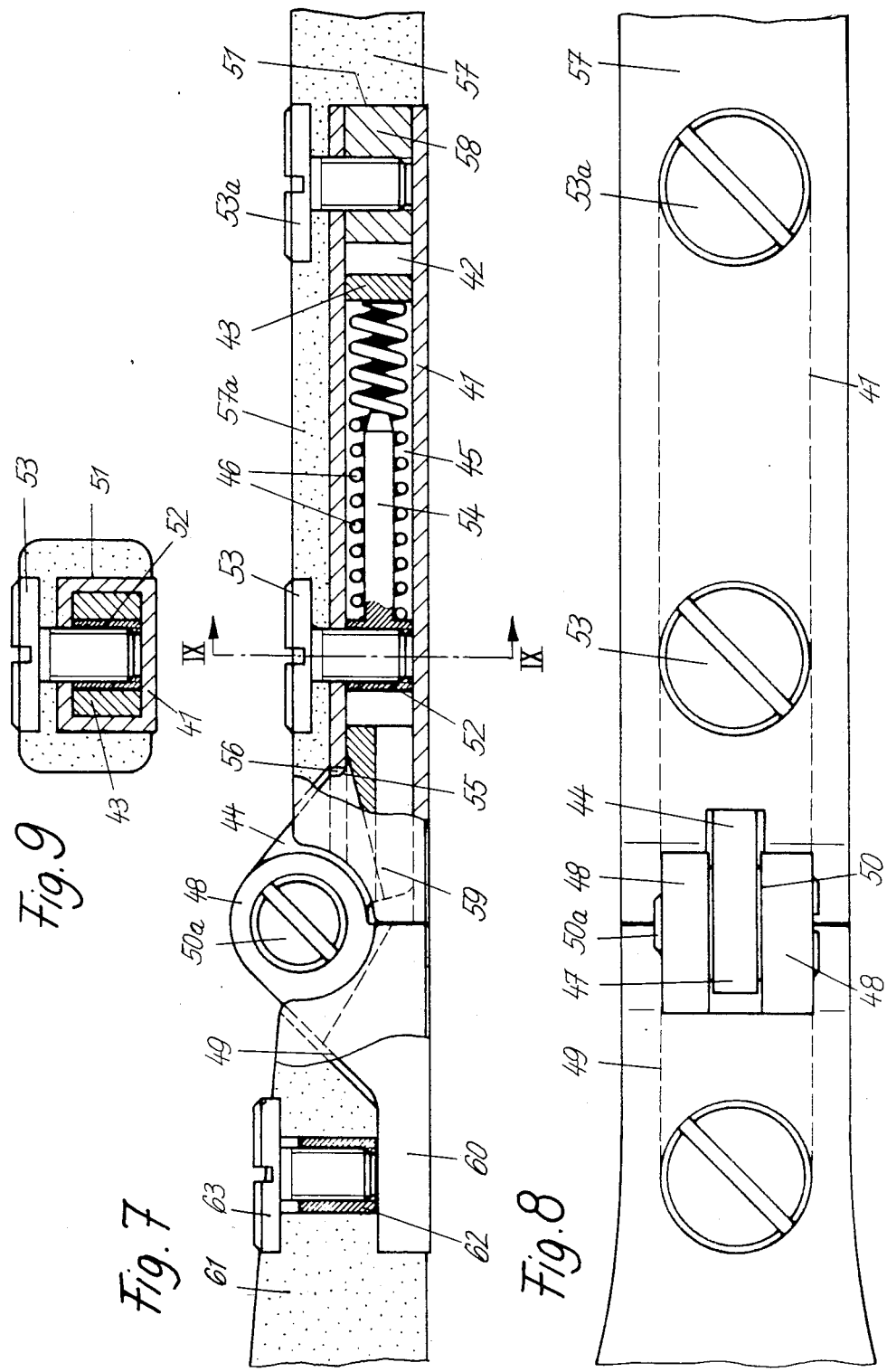

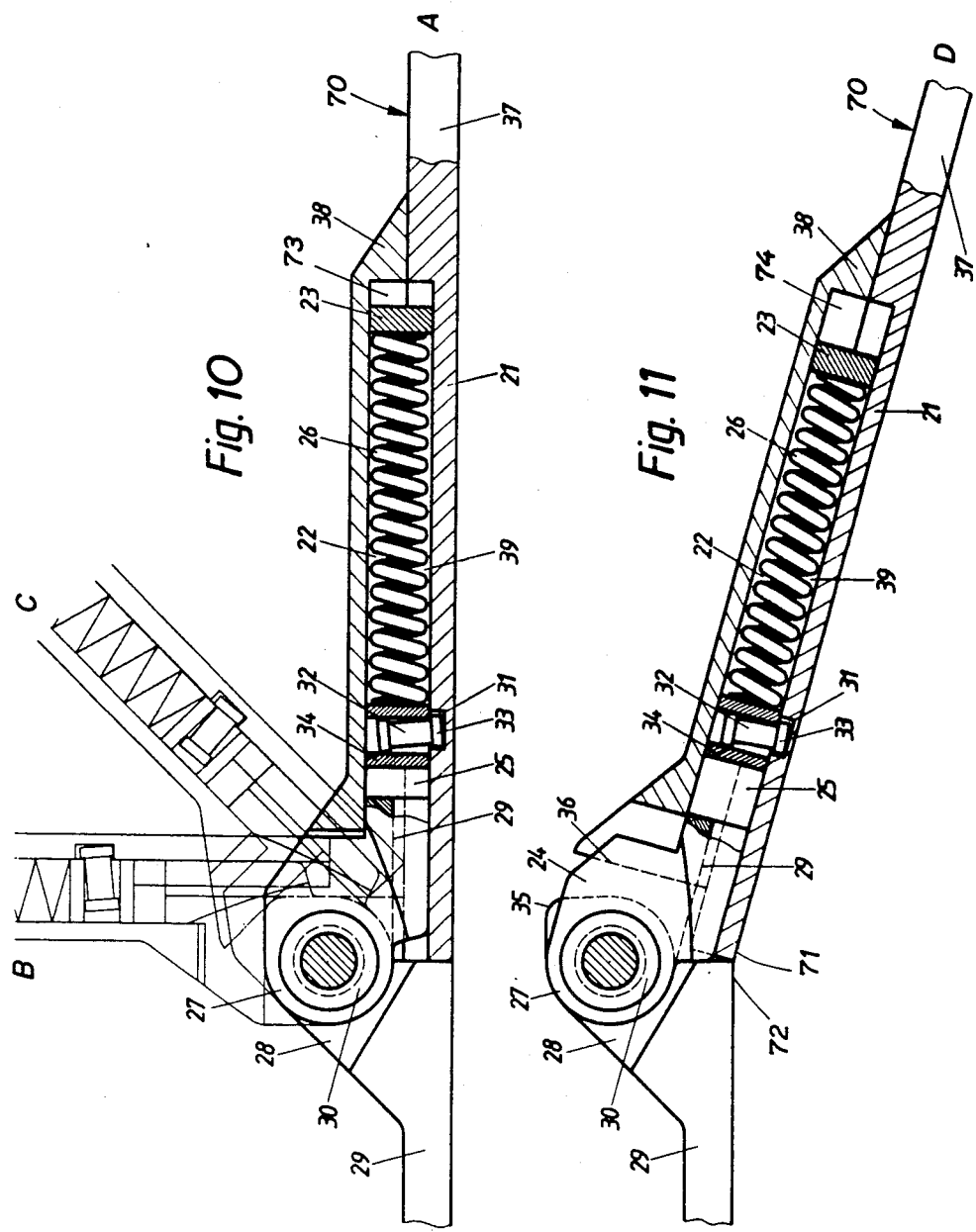

SPRING-BIASED HINGE ASSEMBLY FOR SPECTACLES

This application is a continuation-in-part of application Ser. No. 478,709, filed Mar. 25, 1983, now abandoned.

This invention relates to a spring-biased hinge assembly for spectacles, comprising a bow-side section defining a cavity, a slider provided with a bow-side hinge element and mounted in said cavity and adapted to be moved out of said cavity against spring force, and a midportion-side hinge element, which cooperates with the bow-side hinge element.

In known spring-biased hinge assemblies for spectacles, the bow-side section has one portion which is rigidly secured to the end portion of the bow and another portion which carries a bow-side hinge eye, which is pivoted to the midportion-side element of the hinge assembly. That other portion is adapted to be longitudinally extended beyond a stop which limits the opening movement. That extending movement is opposed by a spring, which is disposed in the bow-side section of the hinge assembly and engages a spring abutment. In spectacles provided with such spring-biased hinge assemblies, the bows can be swung out beyond the position defined by said stop. That portion of the hinge assembly which is firmly connected to the end portion of the bow serves to guide and hold the extensible portion of the hinge assembly.

It is an object of the invention to provide a spring-biased hinge assembly which is slender and ensures a precise guidance and is substantially integrated with the end portion of the bow.

In a spring-biased hinge assembly for spectacles, which hinge assembly comprises a bow-side section defining a cavity, a slider provided with a bow-side hinge element and mounted in said cavity and adapted to be moved out of said cavity against spring force, and a midportion-side hinge element, which cooperates with the bow-side hinge element, this object is accomplished in that the cavity is defined by flat tubular element, the slider comprises a tongue, which is slidably mounted in said cavity and has a longitudinal slot, and the return spring extends in said slot and engages a spring abutment, which extends from said tubular element through said slot. The tongue of the slider carries an intermediate hinge eye, which extends between two hinges eyes of the midportion-side hinge element and which is preferably provided with a friction liner of plastic material, or the tongue of the slider carries two hinge eyes, which are disposed on opposite sides of an intermediate hinge eye of the midportion-side hinge element, in which case said intermediate hinge eye is also preferably provided with a friction liner of plastic material.

Further details of the design of the spring-loaded hinge assembly according to the invention, particularly regarding the means for locking the spring, the means for preventing backlash and the means for providing a snap effect toward the closed and open positions are illustrated for two preferred embodiments in the drawings, in which FIGS. 1, 2 and 3 are, respectively, a longitudinal sectional view, a top plan view, partly cut open, and a transverse sectional view taken on line III—III in FIG. 1, showing a first embodiment of a spring-biased hinge assembly, FIGS. 4, 5 and 6 are, respectively, a longitudinal sectional view, a top plan view, partly cut open, and a transverse sectional view taken on line VI—VI of FIG. 4, showing a second embodiment, FIG. 7 is a longitudinal sectional view showing a third embodiment of a spring-biased assembly, and FIGS. 8 and 9 are a top plan view showing the embodiment of FIG. 7 and a transverse sectional view taken on line IX—IX in FIG. 7.

FIG. 10 shows the normal open position A of the eyeglass bow, with a closed position B shown in phantom and a snapped position C shown in phantom between both positions A and B.

FIG. 11 shows the eyeglass bow in an over-center position D.

Figure 12:
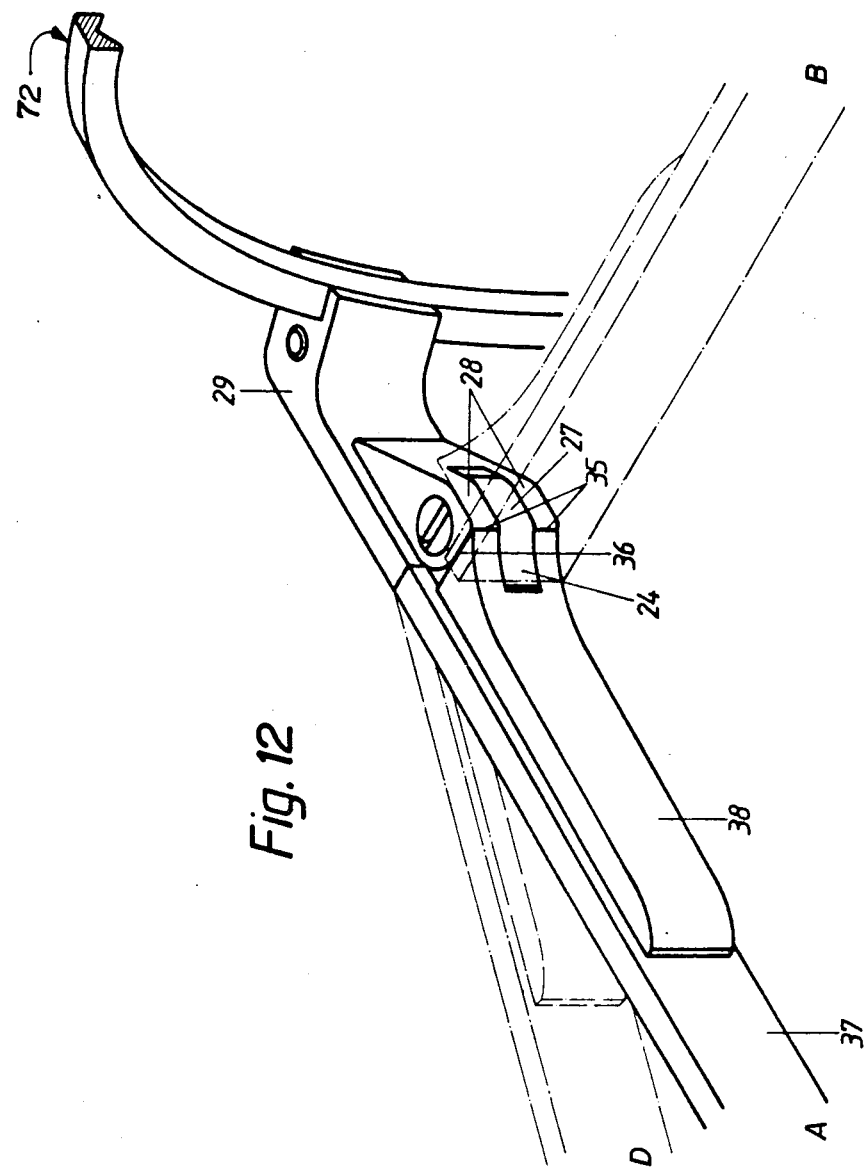
FIG. 12 is a perspective illustration of the eyeglass bow secured to an eyeglass frame, the normal open position A, the closed position B, and the over-center position D being shown in phantom.

In the first embodiment shown in FIGS. 1 to 3 the spring-biased hinge assembly comprises a bow-side section, which comprises a flat tubular element 1, which defines a cavity 2 containing a slider, which comprises a tongue 3 and a bow-side hinge element 4. The tongue 3 is longitudinally slidable in the cavity 2 and has a longitudinally extending slot 5, in which a return spring 6 extends. The bow-side hinge element 4 carried by the tongue 3 comprises an intermediate hinge eye 7, which is disposed between two outer hinge eyes 8 of the midportion-side hinge element 9. The intermediate hinge eye 7 is provided with a friction liner 10.

An abutment for the spring 6 comprises a pin 12, which extends through the tongue 3 and has an annular head 13, which extends into an opening 11 formed in the wall of the tubular element 1 when the latter is engaged by the spring 6. The pin 12 is surrounded by a sleeve 14, which extends through the slot 5 and the diameter of which equals the width of the slot 5.

As is further apparent from FIG. 1, the hinge element 4 is provided at its transition to the tongue 3 with a beveled surface 15, which engages a mating surface 16 at the adjacent end of the tubular element 1 so that backlash will be prevented by the action of the spring 6. The bow 7 is secured by a screw or rivet at 18 to the opposite end of the tubular element 1, which defines the cavity 2.

In the second embodiment, shown in FIGS. 4 to 6, the spring-biased hinge assembly comprises a bow-side section including a flat tubular element 21, which defines a cavity 22, which accommodates a tongue 23, which carries a bow-side hinge element 24. The tongue 23 is longitudinally slidable in the cavity 22 and has a longitudinal slot 25, in which a return spring 26 extends, as in the first embodiment. The bow-side hinge element 24 comprises an intermediate hinge eye 27, which extends between two outer hinge eyes 28 of a midportion-side hinge element 29. The intermediate hinge eye 27 is provided with friction linear 30. In a modification, not shown, the bow-side hinge element carried by the slidable tongue may comprise two outer hinge eyes disposed on opposite sides of an intermediate hinge eye of the midportion-side hinge element.

In this embodiment the spring abutment extending through the slidable tongue 23 comprises a cylindrical pin 32, which extends into a recess 31 formed in the inside surface of the tubular member 21. The pin 32 is provided with an enlarged end portion 33, which extends into the recess 31 and locks the pin 32 in the tubular element 21 under the action of the spring 26. The pin 32 is surrounded by a sleeve 34, which extends through the slot 25 and has a diamter that is equal to the width of the slot 25.

As is further apparent from FIG. 4, the hinge eyes 28 of the midportion-side hinge element 29 comprise cams 35 for engaging the end face 36 of the tubular element 21 and producing a snap action toward the closed and open positions. In this embodiment the tubular member 21 defining the cavity 22 consists of an extension of the bow end portion 37, which extension is formed with a recess 39, and a channel-shaped member 38 secured to the bow end portion 37.

In the embodiments shown in FIGS. 1 to 6, the hinge assembly is assembled in that the sleeve 14 or 34 surrounding the pin 12 or 32 is inserted against the action of the spring 6 or 26 by means of a pin through a passage 19 or 29 defined by the bow-side hinge element 4 or 24 and the tubular element 1 or 21 into the cavity 2 or 22 until the pin 12 snaps into the opening 11 or the pin 32 snaps into the recess 31.

As in the embodiments shown in FIGS. 1 to 6, the spring-biased hinge assembly shown in FIGS. 7 to 9 comprises a bow-side section comprising a flat tubular element 41, which defines a cavity 42, and a slider comprising a tongue 43, which is slidably mounted in the cavity 42 and carries a bow-side hinge element 44. The slidable tongue 43 is formed with a longitudinal slot 45, in which the return spring 46 extends. The bow-side hinge element 44 carried by the tongue 43 comprises an intermediate hinge eye 47, which extends between two outer hinge eyes 48 of the midportion-side hinge element 49. The intermediate hinge eye 47 is provided with a friction linear 50, which cooperates with a hinge screw 50a.

In this embodiment the tubular element 41 formed with the cavity 42 has been inserted into a recess 51 formed in the outside surface an extension 57a of a plastic bow 57. The abutment for the return spring 46 consists of a tapped sleeve 52, into which a first fixing screw 53 has been screwed. A second fixing screw 53a has been screwed into an end plug 58 fitted in the tubular element 41 and connects the latter to the plastic bow 57. The tapped sleeve 52 is rectangular in a transverse section through the tubular element 41 and fits the cavity 52 and is provided with a radial guide pin 54, which is surrounded by the spring 46 and prevents a canting of the sleeve 52 during its insertion.

As in the embodiment shown in FIGS. 1 to 3, the bow-side hinge element 44 is provided at its transition to the tongue 43 with a beveled surface 55 for engaging a mating end face portion 56 of the tubular member element 41 so that backlash will be prevented by the action of the spring 46. As has been described hereinbefore, the tubular element 41 defining the cavity 42 is held by means of the fixing screws 53 and 53a in the recess 51 defined in the outside surface of a bow end portion 57a. To assemble the hinge assembly, the tubular element 41 is inserted into the recess 51 of the plastic bow 57, the screw 53a is screwed into the end plug 58 and the sleeve 52 is then forced my means of an inserting pin through the passage 59 defined by the bow-side hinge element 44 and the tubular element 41 into the cavity 42 against the action of the spring 46, which embraces the guide pin 54. When the sleeve 52 has been sufficiently inserted, the screw 53 can be screwed into the sleeve 52.

In this case the associated midportion-side hinge element 59 comprises an outer plate 60, which carries an inwardly protruding tapped sleeve 62, which is open at its inner end and extends into the plastic spectacle frame portion 61. The hinge element 59 is secured to the frame portion 61 by a fixing screw 63, which has been screwed into the socket 62.

What is claimed is:

1. A hinge assembly for a pair of spectacles, comprising:
   a mid-portion-side hinge element having a portion attachable to said spectacles, said hinge element having a pair of spaced-apart hinge eyes;
   a flat tubular element having a longitudinal cavity provided with an open end;
   a tongue slidably supported in said cavity, said tongue having an end extending out of said cavity and terminating in a bow-side hinge element having a hinge eye, said tongue having an internal slot extending longitudinally across a pair of wall surfaces;
   means for pivotally interconnecting said bow-side and mid-portion-side hinge elements together;
   cam means adjoining the open end of said flat tubular element;
   cam means associated with at least one of said hinge elements;
   a spring disposed in said slot for opposing the movement of said tongue out of said cavity;
   a spring abutment extending transversely through said slot in said tongue and positioned in said slot;
   a pin extending through said spring abutment, said bow-side hinge element and one end of said flat tubular element defining a mounting tunnel to accommodate the movement of said bow-side hinge element; and
   means on said flat tubular element for immobilizing said pin in a predetermined position on said flat tubular element, whereby, when said spring is placed during assembly under compression, said spring will force the cam means on said flat tubular element against the cam means on at least one of said hinge elements.

2. A hinge assembly according to claim 1, wherein said bow-side hinge element has an eye provided with a friction liner of plastic material.

3. A hinge assembly according to claim 1, wherein said means comprises a recess in the bow-side element adapted to receive one end of said pin to immobilize one end of said spring.

4. A hinge assembly according to claim 3, wherein said one end of said pin is provided with an enlarged end portion.

5. A hinge assembly according to claim 1, wherein said spring abutment includes a sleeve which has an outside diameter equal to the width of said slot.

6. A hinge assembly according to claim 24, wherein the cam means on said tubular element comprises a mating surface cooperating with a bevel surface on the bow-side hinge element.

7. A hinge assembly according to claim 24, wherein the cam means on said tubular element comprises an end face cooperating with cams on the hinge eyes of said mid-portion-side hinge element.

* * * * *